United States Patent [19]

Vaughan

[11] 4,201,058

[45] May 6, 1980

[54] METHOD AND APPARATUS FOR GENERATING STEAM

[76] Inventor: Raymond C. Vaughan, 135 E. Main St., Hamburg, N.Y. 14075

[21] Appl. No.: 844,877

[22] Filed: Oct. 25, 1977

Related U.S. Application Data

[62] Division of Ser. No. 655,477, Feb. 5, 1976, Pat. No. 4,087,974.

[51] Int. Cl.$^2$ ............................................. F01K 23/10
[52] U.S. Cl. ........................................ 60/618; 60/624; 60/641
[58] Field of Search ................... 60/618, 624, 641; 123/119 C; 62/238 E, 324 D, 323 R; 237/12.1, 2B

[56] References Cited

U.S. PATENT DOCUMENTS

| | | | |
|---|---|---|---|
| 1,489,501 | 4/1924 | Miner | 237/12.1 |
| 2,375,157 | 5/1945 | Wilkes | 62/238 E |
| 3,214,100 | 10/1965 | Aronson | 237/12.1 |
| 3,308,877 | 3/1967 | Gerteis | 62/324 D |
| 4,065,055 | 12/1977 | DeCosimo | 237/12.1 |

*Primary Examiner*—Ronald H. Lazarus
*Attorney, Agent, or Firm*—Christel, Bean & Linihan

[57] ABSTRACT

A method and apparatus for generating steam including an internal combustion engine providing mechanical energy and also thermal energy which is commonly referred to as waste heat. In one aspect, the engine drives a heat pump, and the low temperature side of the heat pump removes waste heat from the engine and in some instances also heat from the environment, while the high temperature side of the heat pump delivers heat to an unfired steam boiler. In another aspect, the engine drives a water injectable compressor, and waste heat from the engine is utilized in a heat exchanger to boil water and thereby produce steam at a relatively low temperature and pressure. This steam enters the compressor and emerges therefrom at a relatively high temperature and pressure. In all aspects, the generated steam can be used for such applications as heating or the operation of a steam engine.

9 Claims, 7 Drawing Figures

METHOD AND APPARATUS FOR GENERATING STEAM

This is a division, of application Ser. No. 655,477 filed Feb. 5, 1976, now U.S. Pat. No. 4,087,974.

BACKGROUND OF THE INVENTION

This invention relates to the art of energy conversion, and more particularly to a new and improved method and apparatus for generating steam from the combustion of fuel which steam can be used for example in providing heat or mechanical energy.

The combustion of fuel to produce steam for such uses as the generation of electricity, space heating, and industrial process steam accounts for a substantial part of the energy consumption of the United States. An inherent limitation of fuel-fired steam boilers is that the rate of heat transfer to the water and steam in the boiler is somewhat less than the rate at which chemical energy is released in the combustion of the fuel. Since no other source of heat is utilized, the heat transfer to the water and steam cannot be greater, than the release of chemical energy, and is generally somewhat less due to energy losses to the environment, particularly the loss of the enthalpy of the hot flue gases.

The combustion of fuel to obtain mechanical energy by means of internal combustion engines accounts for another substantial part of the energy consumption of the United States. At best, the mechanical power output of a conventional internal combustion engine is only about thirty-five percent of the rate at which chemical energy is released in the combustion of the fuel. The remainder of the energy is lost to the environment, primarily by loss of the enthalpy of the hot exhaust gases and loss of heat through surfaces adjacent to the combustion chamber. The term waste heat is commonly used to refer to the sum of the heat passing through surfaces adjacent to the combustion chamber and the heat which could be obtained from the hot exhaust gases as they cool to the temperature of the environment. In a typical piston engine, the waste heat output is divided fairly evenly between the exhaust gases and the heat lost through surfaces such as piston crown and cylinder wall which are adjacent to the combustion chamber, while in other engines such as gas turbines, the exhaust gases may represent nearly all of the waste heat output. In some piston engines and other engines, much of the heat passing through surfaces adjacent to the combustion chamber is not transmitted directly to the environment, but is transmitted to an intermediate coolant fluid, such as water or oil, which in turn transmits heat to the environment.

The fundamental problem in converting the waste heat output of an internal combustion engine to useful work is the relatively low temperature at which the heat is available. For example, in the case of heat transmitted to the environment by a coolant, the coolant temperature is typically in the neighborhood of 100° C. An auxiliary heat engine using the internal combustion engine coolant as a heat source could convert only a small fraction of the heat to mechanical energy; thus, operation of such an auxiliary heat engine is usually not practical. The exhaust gases from an internal combustion engine are at a higher temperature, typically in the neighborhood of 450° C.; but, if all of the available heat is to be removed from the exhaust gases, the heat will be obtained over a continuous range of temperature from 450° C. to the temperature of the environment. In general, it is practical to use only the heat obtained from the upper part of this temperature range. Such is the case in typical combined gas turbine-steam turbine cycles where an electrical generator is driven by a gas turbine and where heat from the gas turbine exhaust is used to produce steam for the generation of additional electricity. Very little heat is recovered from the exhaust gases below a temperature of about 200° C.

In order to convert as much as thirty-five percent of the chemical energy of its fuel to mechanical energy, an internal combustion engine must be designed for efficient operation and then must be operated at optimum conditions. For example, with any engine there is a combination of load and speed at which the engine operates most efficiently with respect to fuel utilization. In some applications of internal combustion engines, the engine can be operated near its optimum efficiency most of the time. In other applications, especially in the field of transportation, operating conditions such as load and speed may vary considerably and may often be far from optimum, with the result that the mechanical energy output falls to a value considerably below thirty-five percent of the chemical energy of the fuel, while the waste heat output increases to a value considerably above sixty-five percent. Automobiles have particularly poor efficiency with respect to fuel utilization. A typical automobile engine achieves its best efficiency when operating near full power, but full power operation is rarely required under typical driving conditions. Most of the time, only a small fraction of the maximum engine power is used. Some improvement in efficiency can be obtained, at the expense of maximum rate of acceleration, by putting smaller engines in automobiles so that a greater fraction of the maximum engine power is being used at any given time. Nevertheless, so long as the kinetic and potential energies of a vehicle vary under typical driving conditions, it is not practical to operate the engine continuously at full power unless the vehicle is equipped with a fairly efficient energy storage means such as a mechanical flywheel or other energy reservoir. If the vehicle is so equipped, the engine can be operated at full power to add energy to the reservoir and can be shut off whenever the energy level in the reservoir is adequate.

SUMMARY OF THE INVENTION

It is, therefore, an object of this invention to provide a new and improved method and apparatus for generating steam from the combustion of fuel.

It is a further object of the invention to provide a method and apparatus using the combustion of a fuel to generate steam in such a manner that the rate of energy transfer to the water and steam in the apparatus may exceed the rate at which chemical energy is released in the combustion of the fuel.

It is a further object of this invention to provide a method and apparatus for generating steam using both the mechanical energy output and the waste heat output of an internal combustion engine.

It is a further object of this invention to provide a method and apparatus for supplying mechanical energy, such that steam is generated using the mechanical energy and the waste heat from an internal combustion engine, and such that this steam is used to operate a steam engine to obtain mechanical energy, with the result that the average rate of mechanical energy output from the steam engine may equal or exceed the average rate of mechanical energy output from the internal combustion engine.

It is a further object of this invention to provide a method and apparatus for supplying mechanical energy at a variable rate, such that steam is generated using the mechanical energy and the waste heat from an internal combustion engine operating at constant speed and optimum efficiency, and such that this steam is accumulated in a boiler and is used at a variable rate to operate a steam engine to obtain mechanical energy, with the result that the mechanical energy output of the steam engine may greatly exceed the mechanical energy output of the internal combustion engine for short periods of time.

It is a further object of this invention to provide a method and apparatus for generating steam which is efficient and economical in operation and relatively simple in construction.

The present invention provides a method and apparatus for generating steam utilizing a fuel-operated internal combustion engine which provides mechanical energy and waste heat, wherein the waste heat and in some instances also heat from the environment is used to boil a fluid and produce vapor at relatively low pressure and temperature and wherein the mechanical energy is used to raise the pressure and temperature of the vapor which is in operative relationship with an unfired steam boiler as a means of producing steam. In one aspect of the invention, all or part of the mechanical energy of the internal combustion engine is used to drive a heat pump, and the low temperature side of the heat pump removes waste heat from the engine and in some instances also heat from the environment, while the high temperature side of the heat pump delivers heat to the unfired steam boiler. In another aspect of the invention, all or part of the mechanical energy of an internal combustion engine is used to drive a water-injectable compressor, and waste heat from the engine is used to boil water and thereby produce steam at a temperature and pressure. In all aspects thereof, the generated steam can operate a steam engine providing a mechanical energy output.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figure 1:
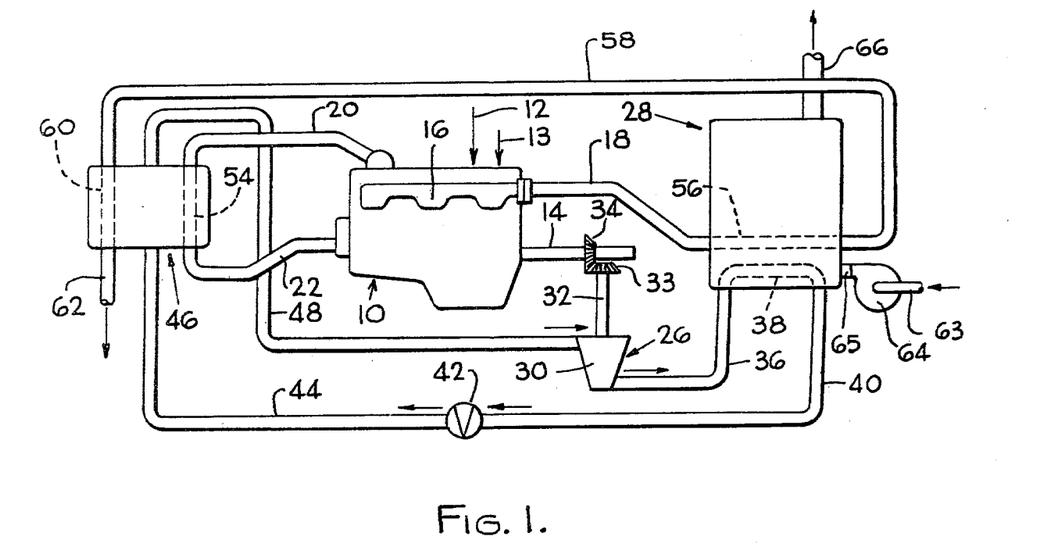
FIG. 1 is a diagrammatic view of the apparatus for generating steam according to the present invention.

Referring now to FIG. 1, the apparatus of the present invention includes an internal combustion engine 10 having a mechanical energy output and a waste heat output. The term internal combustion engine as used in the specification and claims herein is intended to broadly define an engine wherein combustion takes place such that the products of combustion, together with any non-reacting substances such as nitrogen which may be intermingled with the products of combustion, perform work either by exerting force on a moving surface such as a piston or turbine blade or by emerging from and thereby imparting thrust to a moving orifice such as a reaction-turbine nozzle; and wherein the moving surface or moving orifice is coupled to an output component such as a reciprocating rod or rotating shaft from which the work output, or mechanical energy output, of the engine is available. The fuel substance and the oxidizing substance may be supplied to the engine in any form: solid, liquid or gas. The term internal combustion engine is meant to include such specific examples as a gas turbine, a water-cooled gasoline piston engine, an air-cooled gasoline piston engine, a Diesel engine, or a so-called Wankel engine, to mention a few. For example the engine 10 in FIG. 1 could be of the water-cooled gasoline piston type wherein fuel and air are supplied to engine 10 as indicated by the arrows 12 and 13. The mechanical energy output of engine 10 is obtained from a drive shaft 14. Engine 10 in the present illustration is of the type wherein the waste heat output comprises the hot exhaust gases and the heat rejected by the circulating coolant. Thus, engine 10 includes a conventional exhaust manifold 16 and the hot exhaust gases are removed therefrom by an exhaust conduit 18. The engine coolant, in the form of a liquid, flows in a continuous circuit including branch conduits 20 and 22. The outside of engine 10 may be insulated in order to prevent heat loss, so that the waste heat output is confined to the hot exhaust gases and the heat rejected by the engine coolant.

The apparatus of the present invention further comprises a heat pump, generally designated 26, having a low temperature side and a high temperature side. The mechanical energy output of engine 10 is drivingly coupled to heat pump 26, and all or part of the waste heat output of engine 10 is in heat-exchange relationship with the low-temperature side of the heat pump 26, while the high-temperature side of heat pump 26 is in heat-exchange relationship with an unfired steam boiler generally designated 28. Heat pump 26 is shown in FIG. 1 as a conventional type of heat pump; however, other types of heat pumps can be used. In the present invention, heat pump 26 includes a compressor 30 having an input drive shaft 32 which is provided with a gear 33 which meshes with a gear 34 on the engine drive shaft 14 whereby compressor 30 is mechanically driven by engine 10. The compressor 30 serves to compress the working fluid of the heat pump. The working fluid, commonly referred to as the refrigerant of the heat pump, is in the form of a vapor as it passes through the compressor 30. The high pressure output of compressor 30 is connected by a conduit 36 to boiler 28. In particular, conduit 36 is connected to a heat transfer element 38 within the lower region of boiler 28 which element 38 functions as a condenser of the heat-pump refrigerant.

The term heat transfer element used in connection with this and subsequent embodiments includes, for example, a coil or a plurality of tubes in a manifold arrangement. Refrigerant condenser 38 is part of the high-temperature side of heat pump 26. The refrigerant leaves the condenser 38 and boiler 28 through a conduit 40 connected to the high pressure side of an expansion valve 42. Expansion valve 42 is typical of those found in heat pumps, and alternatively a turbine can be employed as the equivalent of expansion valve 42 in a manner known to those skilled in the art. The low pressure side of expansion valve 42 is connected by a conduit 44 to a heat exchanger 46 which functions as an evaporator of the heat pump refrigerant. Refrigerant evaporator 46 is part of the low-temperature side of the heat pump. Refrigerant evaporator 46 is shown diagrammatically in FIG. 1 as a heat exchanger in which the heat pump refrigerant passes through the shell rather than through the tubes of the heat exchanger. Alternatively, one or more heat exchangers in which the heat pump refrigerant passes through the tubes can be employed as the equivalent of refrigerant evaporator 46 as known to those skilled in the art. This would apply also to the heat exchanger and heat transfer elements of the subsequent embodiments. The vaporized refrigerant departs from refrigerant evaporator 46 through a conduit 48 which leads to the low pressure side of compressor 30. The branch conduits 20 and 22 carrying the coolant from engine 10 are connected together by a heat transfer element 54 within heat exchanger 46.

In the present illustration, the hot exhaust gases from engine 10 are placed first in heat-exchange relationship with boiler 28 and then in heat-exchange relationship with the low temperature side of the heat pump. In particular, exhaust conduit 18 is connected to one end of a heat transfer element 56 within the boiler 28, and the outlet end of heat transfer element 56 is connected to a conduit 58 which leads to a heat transfer element 60 within heat exchanger 46. Heat transfer element 60 in turn is connected to an outlet conduit 62 for releasing the substantially cooled exhaust gases, indicated by an arrow, to the environment. Steam output, indicated by an arrow, emerges from boiler 28 through a steam outlet conduit 66. Water input, indicated by an arrow, is supplied to boiler 23 by means of an inlet conduit 63, feedwater pump 64, and conduit 65. Feedwater pump 64 may be one of several conventional types, such as a mechanically driven pump which is driven by engine 10 or a steam injector which is operated by steam from boiler 28. The apparatus of FIG. 1 operates in the following manner. The combustion of fuel in engine 10 produces a mechanical energy output, in the form of rotation of the output or drive shaft 14, and a waste heat output, comprising the hot exhaust gases from exhaust manifold 16 and heat rejected by the coolant flowing continuously through the circuit including branch conduits 20 and 22. Engine 10 is operated at a fairly constant speed. Heat pump 26 is mechanically driven by engine 10 by means of the driving connection between the shaft 14 and the heat pump compressor 30. The working fluid or refrigerant of the heat pump system flows continuously through the heat pump circuit by the action of the compressor 30, in particular through conduit 36, refrigerant condenser 38, conduit 40, expansion valve 42, conduit 44, refrigerant evaporator 46, and conduit 48 back to compressor 30. As a result, the low temperature side of the heat pump including refrigerant evaporator 46 removes heat from the coolant of engine 10. There is also some removal of heat from the engine exhaust gases by virtue of heat transfer element 60 being in heat exchange relationship with the heat pump refrigerant within refrigerant evaporator 46.

The unfired boiler 28 obtains some heat from the hot exhaust gases passing through heat transfer element 56. Also, the high-temperature side of the heat pump including refrigerant condenser 38 delivers heat to the unfired boiler 28 at a temperature sufficient for boiling the water therein at the desired pressure. Thus, the heat pump 26 is constructed and operated such that the refrigerant condenses in condenser 38 at a temperature slightly higher than the desired boiler temperature and such that the refrigerant vaporizes in evaporator 46 at a temperature slightly lower than the desired temperature of the engine coolant. The unfired boiler 28 functions both as a heat exchanger and as an insulated tank capable of storing steam at the desired pressure.

The present illustration wherein the hot exhaust gases from the engine are passed first in heat exchange relationship with boiler 28 and then in heat exchange relationship with the low temperature side of the heat pump before being released to the environment provides a relatively efficient utilization of the thermal energy of the engine exhaust gases. In various applications it may be desirable to utilize the engine exhaust gases in a different way. For example, exhaust manifold 16 and conduit 18 could be connected directly to heat transfer element 60 within heat exchanger 46 so that the engine exhaust gases would be passed in heat exchange relationship only with the low temperature side of the heat pump before being released to the environment. This would result in thermodynamic loss, due to the large temperature difference between the low-temperature side of the heat pump and the incoming exhaust gases, and in more load on the heat pump. Alternatively, conduit 58, heat transfer element 60 and conduit 62 could be eliminated and an exhaust outlet conduit could be connected to heat transfer element 56 for releasing the exhaust gases to the environment at that location. In that case, the exhaust gases from engine 10 would then be passed in heat-exchange relationship only with the water in boiler 28 whereupon the exhaust gases would be released to the environment, resulting in some energy loss due to the rejection of relatively hot gases. In some instances, it may be desirable to place the exhaust gases flowing through conduit 58 in heat-exchange relationship with the boiler feedwater flowing through conduit 65, as a means of heating the feedwater.

Engine 10 is shown as an engine whose waste heat output comprises hot exhaust gases and heat rejected by a liquid coolant, but other types of engines could also be used. In the case of a gas turbine or other engine whose waste heat output consists almost entirely of its exhaust gases, conduits 20 and 22 and heat transfer element 54 could be eliminated, so that refrigerant evaporator 46 would be heated entirely by the exhaust gases passing through heat transfer element 60. In some cases, an engine may have a waste heat output comprising hot exhaust gases and heat lost through surfaces adjacent to the combustion chamber, but may not utilize a circulating liquid coolant. With such an engine, conduits 20 and 22 and heat transfer element 54 could by eliminated, while the walls of refrigerant evaporator 46 could be put in direct contact with engine 10, preferably in contact with surfaces adjacent to the combustion chamber of engine 10, so that heat would flow by conduction directly from the combustion chamber to the refrigerant in refrigerant evaporator 46. An arrangement of this type, in which no intermediate coolant fluid is used, might be constructed with engine 10 and refrigerant evaporator 46 incorporated in an integral housing.

The apparatus illustrated in FIG. 1 serves to generate steam which is available at output conduit 66. This steam can be used, for example, to produce mechanical energy by means of a steam turbine or other steam engine. The wet steam exhausted from the steam engine would preferably be supplied to a steam condenser of conventional type, wherein heat is transmitted from the steam to the environment, resulting in complete condensation of the steam. In theory, the average rate of mechanical energy obtained from such a steam engine using steam from conduit 66 can exceed the average rate of mechanical energy transmitted from internal combustion engine 10 to heat pump 26 for the generation of steam. The rate of heat transfer from the steam condenser to the environment would be less than the rate at which the waste heat of internal combustion engine 10 is utilized to generate steam, thus accounting for conservation of energy. In practice, depending on thermal and thermodynamic losses, the average rate of mechanical energy obtained from a steam engine connected to steam output conduit 66 may be no greater, or only slightly greater, than the average rate of mechanical energy transmitted from engine 10 to heat pump 26 for the generation of steam. Nevertheless, due to the energy storage capacity of boiler 28, the peak power of a steam engine connected to steam output conduit 66 could substantially exceed the maximum power of internal combustion engine 10 for short periods of time. This feature of the present invention can be especially useful in the field of transportation, especially for vehicles such as passenger automobiles, city buses, and commuter trains, which are continually accelerated and decelerated. The internal combustion engine 10 would be operated at nearly constant speed, resulting in efficient use of the energy of the fuel and in minimum production of pollutants, while the speed of the steam engine would vary with the speed of the vehicle. Thus, the internal combustion engine output would not need to match the vehicular energy requirements at every instant, but only on the average.

Depending upon the operating characteristics of engine 10 and upon the desired temperature and pressure of the steam available at output conduit 66, the heat pump 26 may utilize as much as possible of the waste heat of engine 10 but may not require tht total mechanical energy output of engine 10. There are several alternative ways to use this excess mechanical energy. One possible way, to be described below in connection with another embodiment of the present invention, utilizes the excess mechanical energy to generate additional steam, by operating a second heat pump which takes heat from the environment and delivers heat at a higher temperature to the unfired boiler. Alternatively, this excess mechanical energy could be used in various non-thermal ways. In some instances, the mechanical energy could be used either directly or through a mechanical transmission to operate machinery. The mechanical energy could also be used, for example, to generate electricity, to compress air, or to pump hydraulic fluid. The energy of the electricity, compressed air, or hydraulic fluid could be in turn converted to mechanical energy as needed. The output of such a system would thus be both steam and electricity, or both steam and compressed air, or both steam and hydraulic power, or mechanical energy supplied by a steam engine-electric motor combination, a steam engine-air motor combination, or a steam engine-hydraulic drive combination, to mention a few. For a given energy output, the theoretical thermodynamic efficiency of these systems is greater than that of a fuel-fired boiler and/or an internal combustion engine operating separately.

Figure 2:
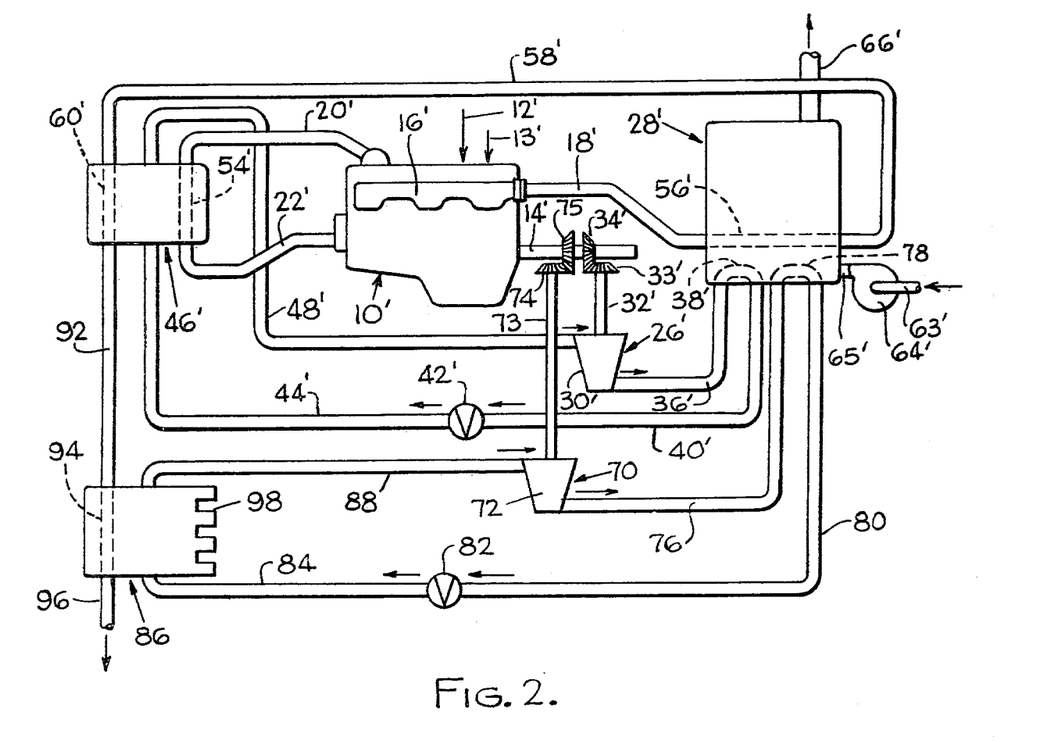
FIG. 2 is a diagrammatic view of apparatus similar to that of FIG. 1 and including two heat pumps.

FIG. 2 illustrates apparatus according to the present invention similar to that of FIG. 1 but modified to include a second heat pump which takes heat from the environment for the generation of additional steam. For convenience in illustration, the components of the apparatus of FIG. 2 similar to those of FIG. 1 are identified with the same reference numeral but provided a prime designation. The apparatus of FIG. 2 includes a second heat pump, generally designated 70, having a low temperature side in heat-exchange relationship with the environment and with the exhaust gases of engine 10' and a high temperature side in heat-exchange relationship with the water in boiler 28', and the mechanical energy output of engine 10' is drivingly coupled to the second heat pump 70. In particular, heat pump 70 includes a compressor 72 having an input drive shaft 73 provided with gear 74 which meshes with another gear 75 provided an output drive shaft 14' of engine 10' for mechanically operating compressor 72. The heat pump working fluid or refrigerant flows through a path or circuit including a conduit 76 connected at one end to the high pressure output side of compressor 72 and at the other end to a heat transfer element 78 within boiler 28' which acts as a condenser for the heat pump refrigerant. The other end of heat transfer element 78 is connected by a conduit 80 to the input of an expansion valve 82 or the equivalent, the low pressure side of which is connected to one end of a conduit 84. The other end of conduit 84 is connected to a heat exchanger 86 which functions as an evaporator of the heat pump refrigerant. The vaporized refrigerant leaves refrigerant evaporator 86 through a conduit 88 which leads to the low-pressure side of compressor 72.

Heat is transferred to the refrigerant in heat exchanger 86 both from the environment and from the exhaust gases of engine 10'. The heat-exchange surface through which heat is transferred from the environment to the refrigerant is shown diagrammatically as a finned section 98 of the shell of heat exchanger 86. The outer surface of the finned section 98 would preferably be in contact with the warmest available heat source in the environment, such as ambient air, water, or sewage, for example. Solar energy absorbed by the outer surface of finned section 98 could also be used as a source of heat. The exhaust gases of engine 10' flow through refrigerant evaporator 86 in the present illustration after having passed through refrigerant evaporator 46' of heat pump 26'. In particular, heat transfer element 60' within refrigerant evaporator 46' is connected to one end of conduit 92, the other end of which is connected to heat transfer element 94 within refrigerant evaporator 86. Heat transfer element 94 is connected to an outlet conduit 96 through which the exhaust gases, indicated by an arrow, are released to the environment. The temperature of the refrigerant in heat exchanger 86 is maintained slightly below the temperature of the environment, so that the exhaust gases released into the environment are approximately the same temperature as the environment.

The apparatus of FIG. 2 operates in a manner similar to that of FIG. 1. Engine 10' is operated at a fairly constant speed, and mechanical energy from engine 10' drives heat pump 26' which takes some heat from the exhaust gases and also takes heat from the coolant of engine 10'. The remaining mechanical energy from engine 10' is used to drive the second heat pump 70 which takes some residual heat from the engine exhaust gases and also takes heat from the warmest available heat source in the environment. The unfired boiler 28' obtains heat from both heat pumps 26' and 70 and also obtains some heat directly from the engine exhaust gases. The steam available at output conduit 66' of boiler 28' can be supplied to the inlet of a steam engine providing a mechanical energy output. The wet steam exhausted from the engine would be supplied to a condenser. Some of the heat from the condenser can be transmitted to the low temperature side of heat pump 70, in particular to the heat exchanger 86, while the remainder of the heat from the condenser would be transmitted to the environment.

The apparatus of FIG. 2 can generate more steam at a given temperature and pressure than can a fuel-fired boiler using the same amount of fuel. In a fuel-fired boiler, the heat transferred to the water and steam in the boiler is somewhat less than the heat of combustion of the fuel, due to thermal losses such as the hot flue gases. The heat transferred to the water and steam in unfired boiler 28' by the apparatus of FIG. 2 exceeds the heat of combustion of the fuel, due to the heat absorbed from the environment by the apparatus of FIG. 2. When combined with a steam engine and condenser, the apparatus of FIG. 2 provides the same advantages as the apparatus of FIG. 1. While two separate heat pumps have been shown and described, alternatively a single heat pump with two separate sections could be employed.

Figure 3:
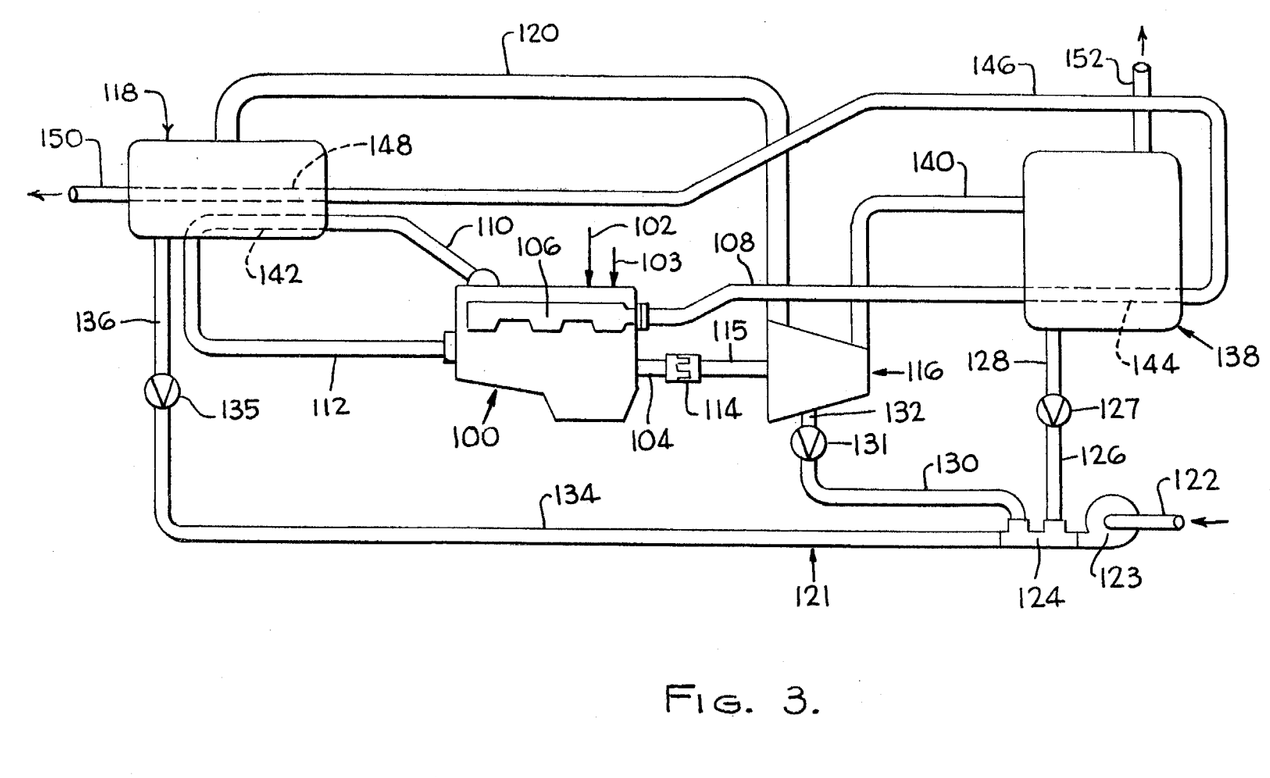
FIG. 3 is a diagrammatic view of apparatus for generating steam according to another embodiment of the present invention.

FIG. 3 illustrates apparatus for generating steam according to another embodiment of the present invention. The apparatus of FIG. 3 comprises the combination of an internal combustion engine, a water-injectable steam compressor, a low-pressure unfired boiler, a high-pressure unfired boiler, and a feedwater distribution system as a means of generating steam. In particular, the apparatus comprises an internal-combustion engine 100 which in the present illustration is identical in construction and operation to engine 10 of the apparatus of FIG. 1. Fuel and air are supplied to engine 100 as indicated by the arrows 102 and 103. Combustion of the fuel-air mixture in engine 100 produces a mechanical energy output in the form of rotation of an output drive shaft 104. Engine 100 produces a waste heat output which in the present illustration includes hot exhaust gases and heat rejected by the engine coolant. In particular, engine 100 includes a conventional exhaust manifold 106 which is connected to an exhaust conduit 108. The engine coolant circulates in a continuous circuit including branch conduits 110 and 112.

The apparatus of FIG. 3 further comprises a feedwater distribution system generally designated 121. Water, indicated by an arrow, is supplied through inlet conduit 122 to feedwater pump 123, which may be a pump of any type suitable for maintaining continuous or semi-continuous flow of water at the desired pressure. Feedwater pump 123 may be driven in various ways such as mechanical energy from engine 100, steam, or electricity. The high pressure output of feedwater pump 123 is connected to a feedwater manifold 124. Feedwater manifold 124 is connected through conduit 126 to the inlet side of a regulating valve 127. The outlet side of valve 127 is connected to a conduit 128. Feedwater manifold 124 is also connected through a conduit 130 to the inlet side of a regulating valve 131, and the outlet side of valve 131 is connected to a conduit 132. Feedwater manifold 124 is also connected through a conduit 134 to the inlet side of a regulating valve 135. The outlet side of valve 135 is connected to a conduit 136. Alternatively, in some instances it may be desirable to use separate pumps to supply water to conduits 126, 130 and 134, rather than supplying water to all three conduits from a single pump.

The apparatus of FIG. 3 further comprises a compressor generally designated 116 having an inlet and an outlet. Compressor 116 is of the type which is suitable for compressing a gas or vapor and is fitted with one or more liquid-injection nozzles in the compression chamber thereof, such that an atomized spray of liquid such as water can be injected by means of the nozzles into the gas or vapor being compressed. Water is supplied to the liquid-injection nozzles through conduit 132. The drive shaft 104 of engine 100 is mechanically connected through coupling 114 to the input shaft 115 of compressor 116 for driving the same. The apparatus of the present invention further comprises a heat exchanger generally designated 118 in which water is boiled at a low pressure. Water is supplied to low-pressure boiler 118 through conduit 136, and steam flows out of low-pressure boiler 118 through conduit 120, the other end of which is connected to the inlet of steam compressor 116. The water in low-pressure boiler 118 is in heat-exchange relationship with the exhaust gases and with the coolant of engine 100. In particular, the coolant circuit comprises branch conduits 110 and 112 which are joined by a heat transfer element 142 within heat exchanger 118.

The apparatus of FIG. 3 further comprises an unfired boiler generally designated 138. The unfired boiler 138 functions both as a heat exchanger and as an insulated tank capable of storing steam at the desired pressure. Water is supplied to boiler 138 through conduit 128. The outlet of steam compressor 116 is connected through a conduit 140 to boiler 138. Steam, indicated by an arrow, flows out of boiler 138 through a steam outlet conduit 152.

The water in unfired boiler 138 is in heat-exchange relationship with the hot exhaust gases from engine 100. In particular, exhaust conduit 108 is connected to one end of a heat transfer element 144 within boiler 138. The other end of element 144 is connected to a conduit 146, which in turn is connected to a heat transfer element 148 within the low-pressure boiler 118. The outlet of element 148 is connected to an outlet conduit 150 through which the substantially cooled exhaust gases, indicated by an arrow, are released to the environment.

The apparatus of FIG. 3 operates in the following manner. The combustion of fuel in engine 100 produces a mechanical energy output, in the form of rotation of shaft 104, and a a waste heat output, comprising the hot exhaust gases from exhaust manifold 106 and heat rejected by the coolant flowing continuously through the circuit including branch conduits 110 and 112. Engine 100, which is operated at a fairly constant speed, drives steam compressor 116. Water is introduced at controlled rates to high-pressure boiler 138 and to low-pressure boiler 118. The hot exhaust gases from engine 100 are first placed in heat-exchange relationship with the water in boiler 138 and then placed in heat-exchange relationship with the water in low-pressure boiler 118.

The circulating coolant of engine 100 is in heat-exchange relationship with the water in low-pressure boiler 118. As a result, waste heat from engine 100 is transmitted to low pressure boiler 118. Boiler 138 is maintained at a relatively high pressure so that water therein vaporizes at a relatively high temperature as it obtains some heat directly from the hot exhaust gases. Low-pressure boiler 118 is maintained at a relatively low pressure, typically less than or approximatey equal to atmospheric pressure, so that water therein vaporizes at a temperature less than or approximately equal to 100° C. as it absorbs heat from the partially cooled exhaust gases and from the coolant of engine 100. As steam is formed in low-pressure boiler 118, it is withdrawn through conduit 120 into the intake of steam compressor 116, thereby maintaining a relatively low pressure inside low-pressure boiler 118. Thus, saturated steam, or vapor, is transmitted from low-pressure boiler 118. In general, the water in low-pressure boiler 118 should be boiled at as high a temperature as possible, but this temperature cannot be greater than the desired temperature of the engine coolant. Thus, the operating characteristics of engine 100 determine the maximum temperature available to boil water in low-pressure boiler 118, and the vapor pressure of water at this temperature is the pressure which should be maintained within low-pressure boiler 118, this being accomplished by appropriate design and adjustment of compressor 116.

The saturated steam entering compressor 116 from conduit 120 is compressed within compressor 116 in order to provide steam at the desired pressure. Steam produced in this manner without water injection in compressor 116 will be superheated rather than saturated since, in general, the adiabatic compression of a saturated vapor causes it to become superheated. By injecting a controlled amount of water into the steam as it is being compressed in compressor 116, the properties of the steam that is produced can be completely controlled, i.e., it can be either saturated or superheated at any given temperature and pressure.

Thus high-pressure saturated or superheated steam is available in conduit 140 connected to the outlet of compressor 116. Steam generated as water is boiled at high pressure in boiler 138, mixes with the steam from conduit 140 within boiler 138, providing a steam output in conduit 152 leading from boiler 138. In a manner similar to that of FIG. 1, the apparatus of FIG. 3 can be connected to a steam engine system wherein conduit 152 would be connected to the inlet of a steam engine to provide a mechanical energy output, and the wet steam exhausted from the engine would be supplied to a steam condenser from which heat would be transmitted to the environment.

The arrangement of FIG. 3 wherein the exhaust gases of engine 100 are utilized to supply heat first to high-pressure boiler 138 and then to low-pressure boiler 118 provides a relatively efficient utilization of the thermal energy of the exhaust gases. In some instances, it may be desirable to connect exhaust conduit 108 directly to heat transfer element 148 within low-pressure boiler 118. In this regard, it should be noted that the output of compressor 116 is steam so that conduit 140 could be connected directly to apparatus such as a steam engine utilizing the steam output. Also, in some instances it may be desirable to place the exhaust gases flowing through conduit 108 or conduit 146 in heat-exchange relationship with the steam being compressed in compressor 116, so that heat is transmitted from the exhaust gases to the steam in compressor 116 at various stages of compression of the steam. For example, compressor 116 could be equipped with a jacket or outer housing through which the exhaust gases would pass. Furthermore, in some instances it may be desirable to place the exhaust gases flowing through conduit 146 in heat-exchange relationship with the feedwater flowing through conduits 128 and 132 as a means of heating the feedwater.

Engine 100 is shown as an engine whose waste heat output comprises hot exhaust gases and heat rejected by a liquid coolant, but other types of engines could also be used. In the case of a gas turbine or other engine whose waste heat output consists almost entirely of its exhaust gases, conduits 110 and 112 and heat transfer element 142 could be eliminated, so that low-pressure boiler 118 would be heated entirely by the exhaust gases passing through heat transfer element 148. In some cases, an engine may have a waste heat output comprising hot exhaust gases and heat lost through surfaces adjacent to the combustion chamber, but may not use a circulating liquid coolant. With such an engine, conduits 110 and 112 and heat transfer element 142 could be eliminated, while the walls of low-pressure boiler 118 could be put in direct contact with engine 100, preferably in contact with surfaces adjacent to the combustion chamber of engine 100, so that heat would flow by conduction directly from the combustion chamber to the water and steam in low-pressure boiler 118. An arrangement of this type, in which no intermediate coolant fluid is used, might be constructed with engine 100 and low-pressure boiler 118 incorporated in an integral housing.

The apparatus of FIG. 3 provides the same advantages as that of FIG. 1, but it eliminates an intermediate heat-transfer step so that it may operate with slightly less thermodynamic loss than the apparatus of FIG. 1. As with the apparatus of FIG. 1, the apparatus of FIG. 3 may utilize as much as possible of the waste heat of internal-combustion engine 100 but may not require the total mechanical energy output of engine 100. As described in conection with the apparatus of FIG. 1, this excess mechanical energy can be used in various nonthermal ways. Alternatively, as described below, this excess mechanical energy can be used for the generation of additional steam.

Figure 4:
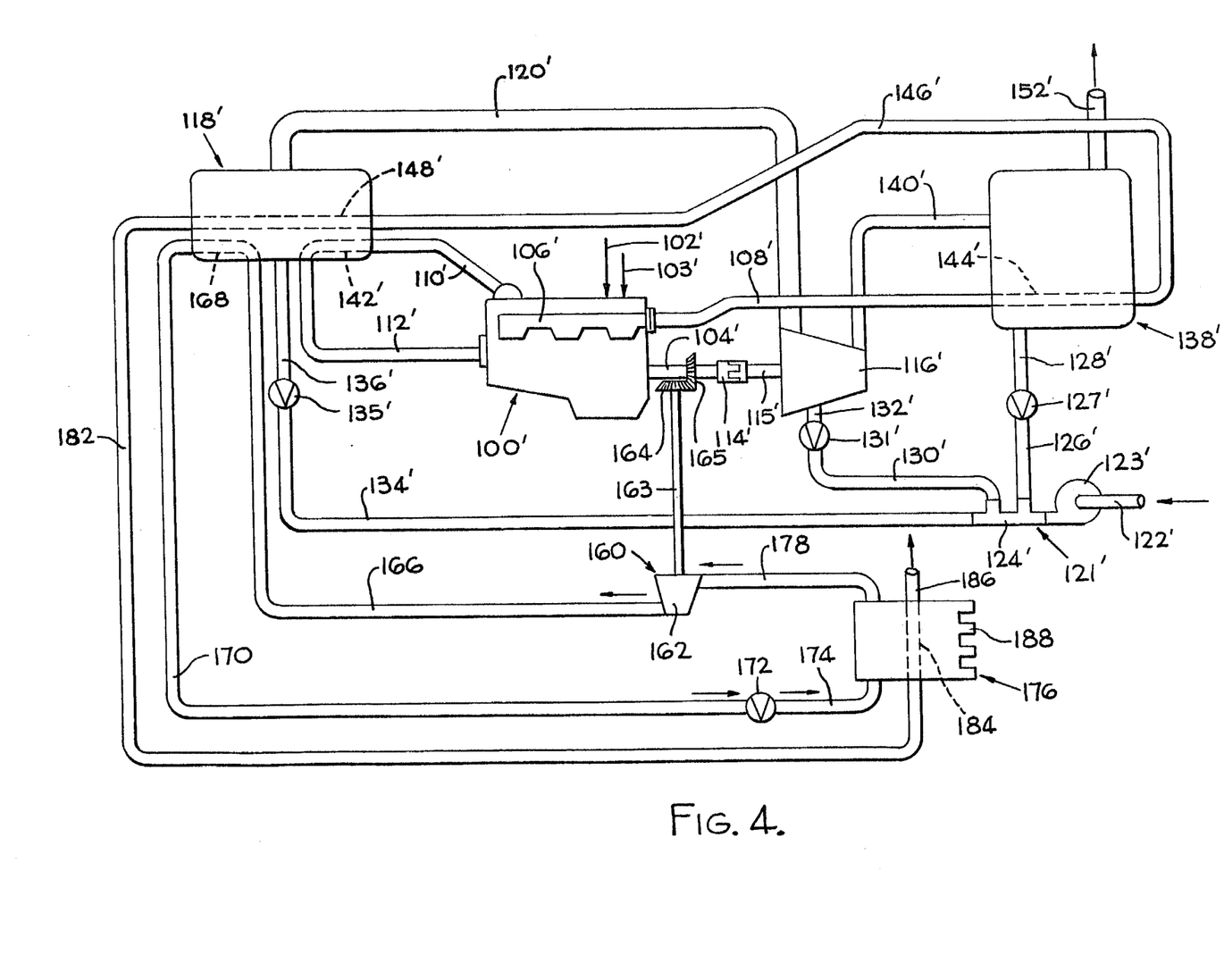
FIG. 4 is a diagrammatic view of apparatus for generating steam according to another embodiment of the present invention.

FIG. 4 illustrates apparatus according to the present invention similar to that of FIG. 3 but modified to include a heat pump which takes heat from the environment for the generation of additional steam. For convenience in illustration, the components of the apparatus of FIG. 4 similar to those of FIG. 3 are identified with the same reference numeral but provided with a prime designation. The apparatus of FIG. 4 includes a heat pump, generally designated 160, having a low-temperature side in heat-exchange relationship with the environment and with the exhaust gases of engine 100' and a high-temperature side in heat-exchange relationship with the water in low-pressure boiler 118'. Part of the mechanical energy output of engine 100' is used to drive heat pump 160. In particular, heat pump 160 includes a compressor 162 for the working fluid or refrigerant of the heat pump system which compressor has a drive shaft 163 provided with a gear 164 which meshes with a gear 165 provided on the engine output drive shaft 104'. The high pressure output side of compressor 162 is connected by a conduit 166 to one end of a heat transfer element 168 within low-pressure boiler 118', the heat transfer element 168 serving as a condenser for the refrigerant of the heat pump system. The other end of heat transfer element 168 is connected by a conduit 170 to the inlet side of an expansion valve 172 or the equivalent, the other side of which is connected by a conduit 174 to a heat exchanger 176 which functions as an evaporator for the heat pump refrigerant. The vaporized refrigerant leaves refrigerant evaporator 176 through a conduit 178 which leads to the inlet of compressor 162. Heat is transferred to the refrigerant in heat exchanger 176 both from the environment and from the exhaust gases of engine 100'. The heat exchange surface through which heat is transferred from the environment to the refrigerant is shown diagrammatically as a finned section 188 of the shell of heat exchanger 176. The outer surface of the finned section 188 would preferably be in contact with the warmest available heat source in the enviroment, such as ambient air, water, or sewage, for example. Solar energy absorbed by the outer surface of finned section 188 could also be used as a source of heat. The exhaust gases of engine 100' flow through refrigerant evaporator 176 in the present illustration after having passed through low-pressure boiler 118'. In particular, heat transfer element 148' within low-pressure boiler 118' is connected to one end of conduit 182, the other end of which is connected to heat transfer element 184 within refrigerant evaporator 176. Heat transfer element 184 is connected to an outlet conduit 186 through which the exhaust gases, indicated by an arrow, are released to the environment. The temperature of the refrigerant in heat exchanger 176 is maintained slightly below the temperature of the environment, so that the exhaust gases released into the environment are approximately the same temperature as the environment. The apparatus of FIG. 4 provides a relatively efficient utilization of the thermal energy of the engine exhaust gases, but other alternatives can be employed as discussed in connection with the preceding embodiments.

The apparatus of FIG. 4 operates in a manner similar to that of FIG. 3. Engine 100' is operated at a fairly constant speed. Water in low-pressure boiler 118' boils at a pressure that is maintained by means of compressor 116', as the water in low-pressure boiler 118' takes some heat from the exhaust gases and also takes heat from the coolant of engine 100' and from the refrigerant of heat pump 160. Compressor 116', which is driven by engine 100', compresses the low-pressure steam generated in low-pressure boiler 118'. The steam is compressed either with or without water injection to produce steam at the desired temperature and pressure as described in connection with the apparatus of FIG. 3. The remaining mechanical energy from engine 100' that is not used to drive compressor 116' drives heat pump 160. Heat pump 160 takes some residual heat from the engine exhaust gases and also takes heat from the warmest available heat source in the environment, thus providing additional heat to low-pressure boiler 118'. Steam is also generated in unfired boiler 138' as water therein obtains some heat directly from the engine exhaust gases. Steam generated in boiler 138' is mixed therein with steam entering through conduit 140' from steam compressor 116'. The steam available at steam outlet conduit 152' can be used for various applications, such as heating or the operation of a steam engine. For the latter application, steam from conduit 152' would be supplied to the inlet of a steam engine providing a mechanical energy output. Wet steam exhausted from the engine would be supplied to a condenser. Some of the heat from the condenser can be transmitted to the low-temperature side of the heat pump 160, in particular to heat exchanger 176, while the remainder of the heat from the condenser would be transmitted to the environment.

The apparatus of FIG. 4 provides the same advantages as that of FIG. 2. In particular, the rate of energy transfer to the water and steam in the apparatus exceeds the rate at which chemical energy is released in the combustion of the fuel.

Figure 5:
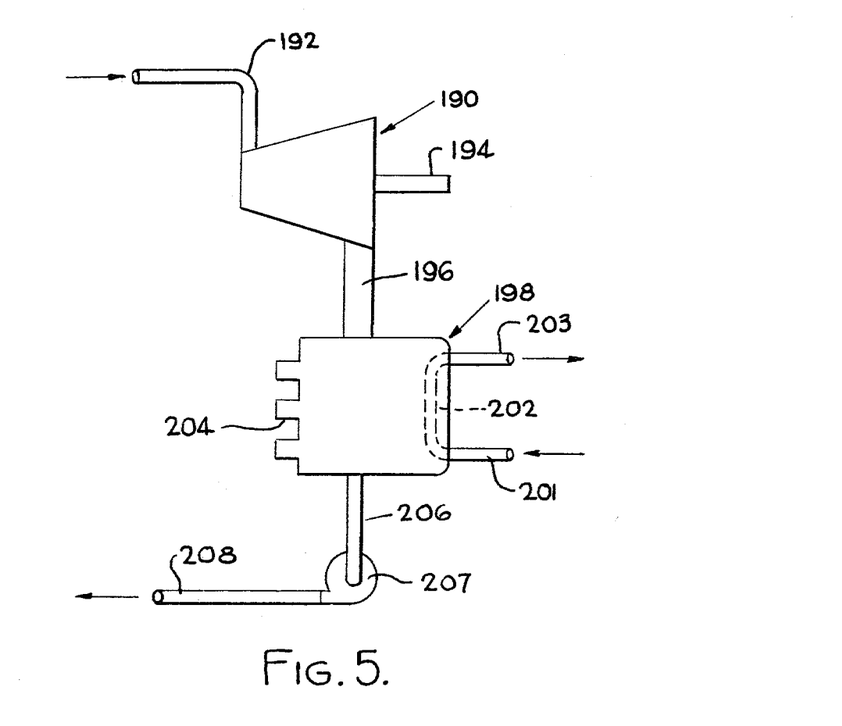
FIG. 5 is a diagrammatic view illustrating a steam engine system operable with the apparatus of the present invention.

FIG. 5 illustrates a steam engine system operable with the apparatus of the present invention. A conventional steam engine generally designated 190 in FIG. 5 has an inlet 192 for receiving high-pressure steam, indicated by an arrow. Steam engine 190 produces a mechanical energy output in the form of rotation of an output drive shaft 194. For example, inlet 192 of engine 190 can be connected to steam outlet conduit 66 of the apparatus of FIGS. 1 and 2 or steam outlet conduit 152 of the apparatus of FIGS. 3 and 4. Steam within engine 190 flows against turbine blades, a piston, or the like in a known manner to produce a rotation of shaft 194, while the steam expands adiabatically and partially condenses as a result. The wet steam leaves engine 190 through outlet conduit 196. The system further comprises a conventional steam condenser 198, shown diagrammatically in FIG. 5, the inlet of condenser 198 being connected to conduit 196. Steam in condenser 198 is placed in heat-exchange relationship with the environment. A fluid such as water, indicated by an arrow, may be taken from the environment into an inlet conduit 201 which is connected to a heat transfer element 202 within condenser 198. Heat transfer element 202 is connected at the other end to outlet conduit 203 through which the fluid is returned to the environment as indicated by an arrow. The fluid entering inlet conduit 201 from the environment would preferably be as cold as possible. As an alternative or as a supplementary means of transferring heat from the condensing steam to the environment, heat may pass through a surface such as finned section 204 of the outer wall or shell of condenser 198. The outer surface of finned section 204 would preferably be in contact with the coldest available heat sink in the environment. When the steam engine system of FIG. 5 is combined with the apparatus of either FIG. 2 or FIG. 4, part of the heat transmitted from the condensing steam in condenser 198 may be transmitted directly to refrigerant evaporator 86 of the apparatus of FIG. 2 or to refrigerant evaporator 176 of the apparatus of FIG. 4. In any case, at least part of the heat from the condensing steam in condenser 198 must be transmitted to the environment. The water or so-called condensate resulting from the condensation of steam in condenser 198 is removed therefrom through a conduit 206, which is connected to the inlet of a conventional condensate pump 207. The outlet of pump 207 is connected to a conduit 208 from which the condensate, shown by an arrow, may be returned to the steam generating system to be reevaporated. For example, this could be the case with the apparatus of FIGS. 1 and 2 wherein conduit 208 could be connected to inlet conduit 63. Similarly, conduit 208 could be connected to inlet conduit 122 of the apparatus of FIGS. 3 and 4. In some cases it may be necessary to remove accumulated air from inside condenser 198 which can be done by means of conventional apparatus (not shown).

Figure 6:
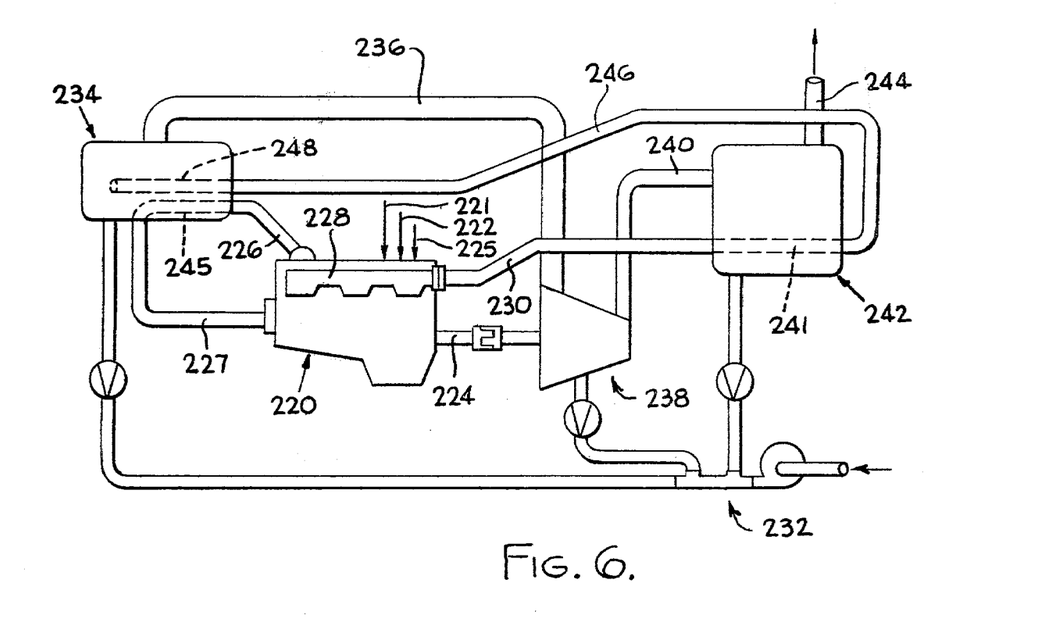
FIG. 6 is a diagrammatic view of apparatus for generating steam according to another embodiment of the present invention.

FIG. 6 illustrates apparatus according to the present invention similar to that of FIG. 3 but modified to operate on a fuel mixture of hydrogen and oxygen. An internal combustion engine 220 is adapted to operate on a fuel mixture of hydrogen and oxygen, which are supplied to engine 220 as indicated by arrows 221 and 222. Engine 220 provides a mechanical energy output in the form of rotation of an output drive shaft 224, and has a coolant circuit including conduits 226 and 227. Engine 220 differs from the engines of the previous embodiments in that it is fueled by the hydrogen-oxygen mixture rather than by a hydrocarbon fuel and air, and in that the resulting exhaust gas consists essentially of pure steam. The exhaust gas is removed from engine 220 by an exhaust manifold 228 and exhaust conduit 230. In some cases it may be advantageous to equip engine 220 with a water-injection system, such that an atomized spray of droplets of water can be injected into the combustion chamber of engine 220 as the engine operates on a hydrogen-oxygen fuel mixture. Combustion temperatures could be regulated by means of the water injection, while the engine exhaust gas would still consist essentially of pure steam. Water would be supplied to engine 220 for this purpose, as indicated by arrow 225, and injected at a controlled rate into the combustion chamber. For example, in the case of a piston engine, where the water would be injected into the cylinders, the water-injection system could be similar to the fuel-injection system of a conventional Diesel engine.

The apparatus of FIG. 6 further comprises a feedwater distribution system 232, a low-pressure boiler 234, a water-injectable steam compressor 238, and a high-pressure boiler 242. Feedwater distribution system 232, which supplies water at controlled rates to low-pressure boiler 234, steam compressor 238, and high-pressure boiler 242, can be identical in construction and operation to feedwater distribution system 121 of the apparatus of FIG. 3.

Water in low-pressure boiler 234 is placed in heat-exchange relationship with the circulating coolant of engine 220. In particular, the coolant circuit comprises branch conduits 226 and 227 which are joined by heat transfer element 245 within low-pressure boiler 234. The water in low-pressure boiler 234 is placed in heat-exchange relationship with, and is also mixed with, the exhaust gas (i.e., steam) from engine 220 as the exhaust gas flows through conduit 248, one end of which opens into the interior of low-pressure boiler 234. Steam flows out of low-pressure boiler 234 through conduit 236, the other end of which is connected to the inlet of steam compressor 238. Steam compressor 238 can be identical in construction and operation to compressor 116 of the apparatus of FIG. 3. Steam flows out of compressor 238 through conduit 240, the other end of which is connected to unfired boiler 242. Boiler 242 can be identical in construction and operation to boiler 138 of the apparatus of FIG. 3. Steam flows out of boiler 242 through steam outlet conduit 244, as indicated by an arrow.

The water in unfired boiler 242 is in heat-exchange relationship with the hot exhaust gas (i.e., steam) from engine 220. In particular, exhaust conduit 230 is connected to a heat transfer element 241 within boiler 242. The outlet of heat transfer element 241 is connected to conduit 246 which, in turn, is connected to conduit 248 which is open to the interior of low-pressure boiler 234, thus allowing the engine exhaust gas (i.e., steam) flowing through conduit 248 to mix with the water and steam within low-pressure boiler 234. The length and surface area of conduit 248 will determine the amount of heat transfer that takes place before mixing occurs. The open end of conduit 248 may be located below the level of the water in low-pressure boiler 234, thus maintaining a slight pressure difference between the steam in low-pressure boiler 234 and the exhaust gas (i.e., steam) in conduit 248. The steam emerging from conduit 248 would thus bubble up through the water in low-pressure boiler 234.

The apparatus of FIG. 6 operates in the following manner. The combustion of hydrogen and oxygen in engine 220, which may be accompanied by the injection of water into the combustion chamber, produces a mechanical energy output in the form of rotation of shaft 234 which drives steam compressor 238. Engine 220 is operated at a fairly constant speed. Water is introduced at controlled rates to high-pressure boiler 242 and to low-pressure boiler 234. The hot exhaust gas (i.e., steam) from engine 220 first is placed in heat-exchange relationship with the water in boiler 242 and then is placed in heat-exchange relationship with and allowed to mix with the water and steam in low-pressure boiler 234. The hot exhaust gas (i.e., steam) undergoes a slight decrease in pressure and a slight decrease, or substantially no change, in specific volume as it loses heat while flowing from engine 220 to the outlet end of conduit 248. The circulating coolant of engine 220 is in heat-exchange relationship with the water in low-pressure boiler 234. Boiler 242 is maintained at a relatively high pressure so that water therein vaporizes at a relatively high temperature as it obtains some heat directly from the engine exhaust gas. Low-pressure boiler 234 is maintained at a relatively low pressure, which may be as low as or lower than atmospheric pressure, so that water therein vaporizes at a temperature that may be as low as or lower than 100° C., as it absorbs heat from the engine exhaust gas (i.e., steam) and from the coolant of engine 220. Steam formed in low-pressure boiler 234 and steam entering low-pressure boiler 234 from conduit 248 are withdrawn through conduit 236 into the intake of steam compressor 238, thereby maintaining a relatively low pressure inside low-pressure boiler 234, as described in connection with the apparatus of FIG. 3.

The saturated steam entering compressor 238 from conduit 236 is compressed within compressor 238 in order to produce steam at the desired pressure. By injecting a controlled amount of water into the steam as it is being compressed in compressor 238, the properties of the steam that is produced can be completely controlled, as described in connection with the apparatus of FIG. 3. High-pressure saturated or superheated steam flows out of compressor 238 through conduit 240. Steam generated as water is boiled at relatively high pressure in boiler 242 mixes with the steam entering boiler 242 through conduit 240, providing a steam output in conduit 244 leading from boiler 242. The apparatus of FIG. 6 can be connected to a steam engine system such as the apparatus of FIG. 5 in order to provide a mechanical energy output. For example, steam outlet conduit 244 would be connected to steam inlet conduit 192 of the apparatus of FIG. 5.

The apparatus of FIG. 6 utilizes the exhaust gas (i.e., steam) from engine 220 to supply heat first to high-pressure boiler 242 and then to low-pressure boiler 234, but other arrangements can be employed as discussed in connection with the apparatus of FIG. 3. One such arrangement would be to place the exhaust-gas (i.e., steam) flowing through conduit 230 or conduit 246 in heat-exchange relationship with the steam being compressed in compressor 238, so that heat would be transmitted to the steam in compressor 238 at various stages of compression.

Engine 220 is shown as an engine whose waste heat output includes heat rejected by a liquid coolant, but other types of engines could also be used. In the case of a gas turbine or other engine wherein there is little or no heat loss through surfaces adjacent to the combustion chamber, conduits 226 and 227 and heat transfer element 245 could be eliminated, so that low-pressure boiler 234 would be heated entirely by the exhaust gas (i.e., steam) entering from conduit 246. Alternatively, the engine could be of the type wherein some heat is lost through surfaces adjacent to the combustion chamber, but wherein a circulating liquid coolant is not used. With such an engine, conduits 226 and 227 and heat transfer element 245 could be eliminated, while the walls of low-pressure boiler 234 could be put in direct contact with engine 220, preferably in contact with surfaces adjacent to the combustion chamber of engine 220, so that heat would flow by conduction directly from the combustion chamber to the water and steam in low-pressure boiler 234. An arrangement of this type, in which no intermediate coolant fluid is used, might be constructed with engine 220 and low-pressure boiler 234 incorporated in an integral housing.

The apparatus of FIG. 6 provides the same advantages as that of FIG. 3, with the additional advantages of using a renewable and non-polluting fuel. Hydrogen and oxygen may be obtained from the dissociation of water, using solar energy or wind energy to operate the dissociation process. Hydrogen, oxygen and water would be the only components introduced to the combustion chamber of the apparatus of FIG. 6, so that steam and/or water would be the only final products of combustion.

As with the apparatus of FIGS. 1 and 3, the apparatus of FIG. 6 may utilize as much as possible of the waste heat of internal combustion engine 220 but may not require the total mechanical energy output of engine 220. This excess mechanical energy can be used in various non-thermal ways, as described in connection with the apparatus of FIG. 1. Alternatively, this excess mechanical energy can be used to drive a heat pump which takes heat from the environment for the generation of additional steam. Specifically, a heat pump similar to heat pump 160 of the apparatus of FIG. 4 would have its high-temperature side in heat-exchange relationship with the water in low-pressure boiler 234. Such an arrangement would be identical to the apparatus of FIG. 4 except for the adaption of the internal combustion engine to run on a hydrogen-oxygen fuel mixture and except for the termination of the exhaust-gas conduit system inside the low-pressure boiler.

Figure 7:
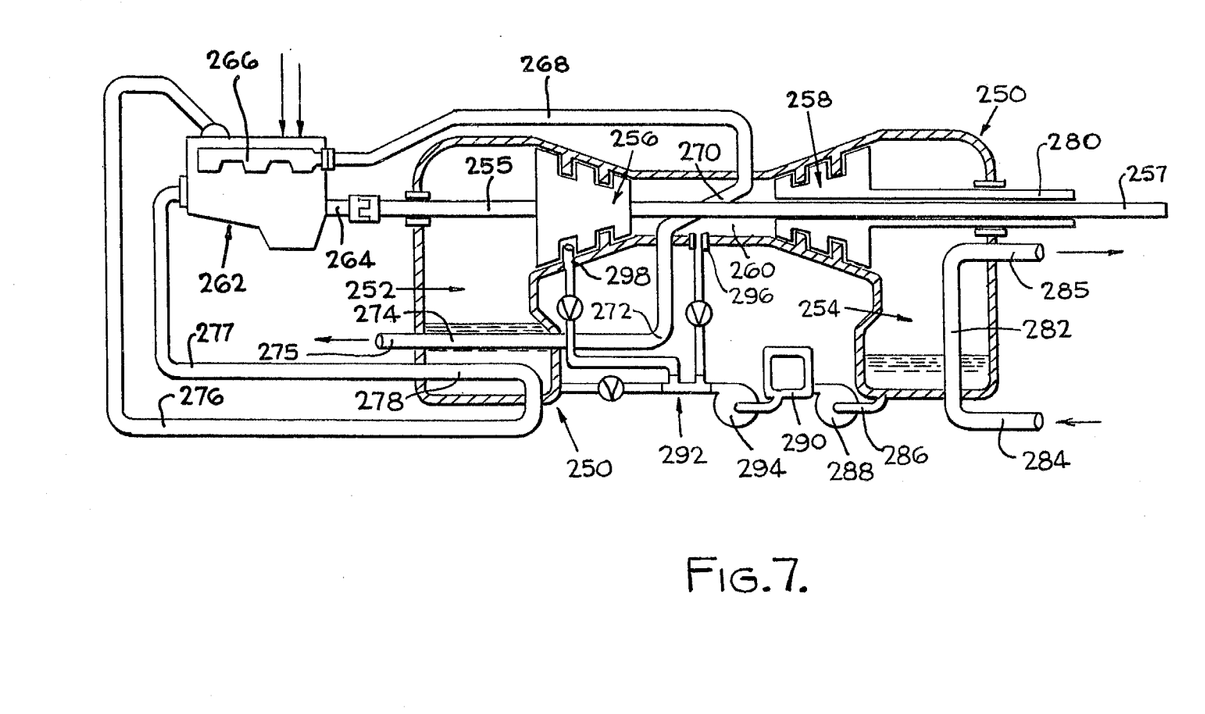
FIG. 7 is a diagrammatic view of a power system further illustrating the present invention.

FIG. 7 is a power system which further illustrates the principles of the present invention. The apparatus of FIG. 7 is essentially the same as a combination of the apparatus of FIGS. 3 and 5, except for the lack of storage capacity for high-pressure steam in the apparatus of FIG. 7. The specific embodiment of FIG. 7 shows several of the components of FIGS. 3 and 5 incorporated in a compact housing; it is, of course, only one of many possible specific embodiments.

The apparatus of FIG. 7 comprises a housing or enclosure 250 defining an evaporator region 252 and a condenser region 254 connected by a intermediate region containing a multi-stage compressor 256 and a multi-stage turbine 258 spaced downstream therefrom so as to provide a flow space or region 260 therebetween. The apparatus of FIG. 7 further comprises a condensate pump 288, the inlet of which is connected by conduit 286 to the bottom of condenser region 254. Condensate pump 288 is equivalent to condensate pump 207 of the apparatus of FIG. 5. The outlet of condensate pump 288 is connected to a water tank or reservoir 290, which in turn is connected to feedwater distribution system 292 including feedwater pump 294. Feedwater distribution system 292, which is equivalent to feedwater distribution system 121 of the apparatus of FIG. 3, supplies water at controlled rates to evaporator region 252, to one or more water-injection nozzles 298 in the vicinity of compressor 256, and to one or more water-injection nozzles 296 in flow space 260.

The apparatus of FIG. 7 further comprises an internal-combustion engine 262, equivalent to engine 10 in FIG. 1, having an output drive shaft 264 mechanically connected to input drive shaft 255 of compressor 256 for driving the same. Fuel and air are supplied to engine 262 as indicated by the arrows. The exhaust gases from engine 262, typically at a temperature of about 450° C., flow from the engine exhaust manifold 266 through an exhaust conduit 268 to a heat transfer element 270 in flow space 260. Heat transfer element 270 provides additional heat to the steam flowing through flow space 260 and to water injected through the one or more nozzles 296. The outlet of heat transfer element 270 is connected to conduit 272, which in turn is connected to heat transfer element 274 in evaporator region 252. Heat transfer element 274 is equivalent to heat transfer element 148 in the apparatus of FIG. 3. The outlet of heat transfer element 274 is connected to outlet conduit 275, through which the substantially cooled exhaust gases are released to the environment, as indicated by an arrow. The coolant circuit of engine 262 is connected by conduits 276 and 277 to a heat transfer element 278 in evaporator region 252. Heat transfer element 278 is equivalent to heat transfer element 142 in the apparatus of FIG. 3. Heat transfer elements 274 and 278 are immersed in the water which occupies the lower part of evaporator region 252. The temperature and pressure within evaporator region 252 depend on the operating characteristics of engine 262 and compressor 256, as described in connection with the apparatus of FIG. 3. The temperature may be as low as 70°–80° C., in which case the pressure would be 0.3–0.5 atmosphere. Steam produced by the evaporation of water in evaporator region 252 is compressed by compressor 256, preferably accompanied by the injection of an atomized spray of droplets of water through one or more nozzles 298. The compressed steam, which may be either saturated or superheated, is heated further as it comes in contact with heat transfer element 270 in flow space 260. Additional water may also be injected through one or more nozzles 296 in flow space 260, depending on the desired properties of the steam entering turbine 258. In any case, the temperature of the steam entering turbine 258 will be less than the temperature of the engine exhaust gases flowing through heat transfer element 270.

The flow of steam through turbine 258 produces mechanical energy output in the form of rotation of turbine shaft 280. Turbine shaft 280 is shown as a hollow shaft which is concentric with shaft 257 connected to compressor 256. The wet steam leaving turbine 258 is condensed in condenser region 254 which includes a heat transfer element 282 connected to conduits 284 and 285. A relatively cool fluid enters conduit 284 from the environment as indicated by an arrow, and returns to the environment through conduit 285 as indicated by an arrow after having absorbed heat from the condensing steam. A heat-transfer surface similar to finned section 204 of the apparatus of FIG. 5 could be used as an alternative or as a supplement to heat transfer element 282. Specific features of condenser region 254 can be identical to those of conventional high-vacuum steam condensers.

The not exhaust gases from engine 262 may be utilized in various alternative ways, as described in connection with the apparatus of FIG. 3. For example, the exhaust gases flowing through conduit 272 may be placed in heat-exchange relationship with the steam being compressed in compressor 256, so that heat is transferred to the steam at intermediate stages of compression. Engine 262 could also be adapted to run on a hydrogen-oxygen fuel mixture, in a like manner to engine 220 of the apparatus of FIG. 6, in which case the engine exhaust gas (i.e., steam) would ultimately be released into the interior of evaporator region 252 rather than being released through conduit 275 into the environment. Although engine 262 is shown as an engine which uses a liquid coolant, other types of engines could also be used, as described in connection with the apparatus of FIGS. 3 and 6.

As with the apparatus of FIGS. 3 and 6, the apparatus of FIG. 7 may utilize as much as possible of the waste heat from engine 262 but may not require the total mechanical energy output of engine 262 to drive compressor 256. In the arrangement of FIG. 7, any excess mechanical energy is available at the end of shaft 257, which is connected to compressor 256 and is thereby connected to input drive shaft 255 of compressor 256. Shafts 255 and 257 are connected to each other collinearly and could thus be regarded as two ends of the same shaft.

The mechanical energy output of the apparatus of FIG. 7 thus is the sum of two separate outputs: energy available from the rotation of shaft 257, being that part of the energy output of engine 262 which is in excess of the requirements of compressor 256, and energy available from the rotation of shaft 280, being the energy output of turbine 258. Depending on the operating characteristics of the components of FIG. 7, shaft 257 may rotate at approximately the same speed as shaft 280 during normal operation, or the two shafts may rotate at substantially different speeds from each other. In general, it would be convenient to combine the energy outputs of the two shafts into a single output. This could be done, for example, by means of a conventional planetary gear arrangement, such that the sun gear is attached to shaft 280 and the planetary pinion gear carrier is attached to shaft 257, while the combined mechanical energy output is obtained from the rotation of the internally toothed ring gear. Alternatively, other conventional methods of mechanical gearing and/or fluid coupling could be used to combine the rotations of shafts 257 and 280 into a single output. If the apparatus of FIG. 7 is to be operated at a constant speed and constant load, it can be designed such that shafts 257 and 280 tend to run at the same speed as each other, in which case the two shafts could be rigidly coupled to each other. In other words, compressor 256 and turbine 258 could both be mounted on a single shaft. This shaft would be coupled to engine 262 at one end, and the same end or opposite end of the shaft would be coupled to the intended load.

Alternatively, the output from shafts 257 and 280 could be used separately, for such purposes as the operation of two different pieces of equipment. Alternatively, the mechanical energy available from shaft 257 could be used to drive a heat pump which takes heat at a relatively low temperature from condenser region 254 and supplied heat at a higher temperature to evaporator region 252, thus increasing somewhat the mechanical energy available from shaft 280.

In any case, regardless to whether the output of shafts 257 and 280 is ultimately combined, the total mechanical energy available from shafts 257 and 280 of the apparatus of FIG. 7 may exceed the mechanical energy available from an internal-combustion engine such as engine 262 operating separately.

It is therefore apparent that the present invention accomplishes its intended objects. While several embodiments of the present invention have been described in detail, this is for the purpose of illustration, not limitation.

I claim:

1. Apparatus for generating vapor such as steam comprising:
    (a) an internal combustion engine having a mechanical energy output and a waste heat output;
    (b) a heat pump having a low temperature side and a high temperature side;
    (c) means operatively connected to said engine and to said heat pump for coupling mechanical energy output from said engine to said heat pump for driving said pump;
    (d) means operatively connected to said engine and to said heat pump for transmitting waste heat output from said engine to the low temperature side of said heat pump;
    (e) an unfired boiler having an inlet for receiving water and an outlet for releasing steam generated in said boiler and
    (f) means operatively connected to said heat pump and to said boiler for placing said boiler in heat exchange relationship with the high temperature side of said heat pump.

2. Apparatus according to claim 1, wherein the waste heat output of said internal combustion engine consists essentially of heat from engine exhaust and wherein said means operatively connected to said engine and to said heat pump for transmitting the waste heat output from said engine comprises means for placing the engine exhaust in heat exchange relationship with said boiler and then in heat exchange relationship with the low temperature side of said heat pump.

3. Apparatus according to claim 1, wherein the waste heat output of said internal combustion engine comprises heat from engine exhaust and heat lost through surfaces adjacent the combustion chamber of said engine and wherein said means transmitting the waste heat output from said engine comprises:
    (a) means placing the engine exhaust in heat exchange relationship with said boiler and then in heat exchange relationship with the low temperature side of said heat pump; and
    (b) means for conducting said lost heat directly from the surfaces adjacent said engine combustion chamber to the low temperature said of said heat pump.

4. In combination with the apparatus according to claim 1: a steam engine operatively connected to said boiler for obtaining mechanical energy output from the flow of steam therethrough and a condenser operatively connected to said steam engine for receiving steam therefrom and exhausting heat from said steam.

5. Apparatus according to claim 1, wherein a portion of the mechanical energy output of said engine is coupled to said heat pump and further including means for coupling the remainder of said energy to a load for use in a non-thermal manner.

6. Apparatus according to claim 1, further including a second heat pump having a low temperature side adapted to receive heat from the environment and a high temperature side in heat exchange relationship with said boiler, and means for coupling the mechanical energy output of said engine to said second heat pump for driving said pump.

7. Apparatus according to claim 6 wherein the waste heat output of said internal combustion engine comprises heat from engine exhaust and werein said means transmitting the waste heat output from said engine comprises:
   (a) means for transmitting a portion of the waste heat output of said engine to the low temperature side of said first-named heat pump; and
   (b) means placing the engine exhaust in heat exchange relationship with said boiler and then in heat exchange relationship with the low temperature side of said first-named heat pump and thereafter in heat exchange relationship with the low temperature side of said second-named heat pump.

8. Apparatus according to claim 6 in combination with a steam engine operatively connected to said boiler for obtaining mechanical energy output from the flow of steam therethrough and a condenser operatively connected to said steam engine and to the low temperature side of said second heat pump for transmitting one portion of the heat from said steam to the environment and transmitting another portion of the heat from said steam to said second heat pump.

9. Apparatus for generating vapor such as steam comprising;
   (a) an internal combustion engine having a mechanical energy output and a waste heat output, the waste heat output comprising heat from engine exhaust and heat from engine coolant;
   (b) a heat pump having a low temperature side and a high temperature side;
   (c) means operatively connected to said engine and to said heat pump for coupling mechanical energy output from said engine to said heat pump for driving said pump;
   (d) means operatively connected to said engine and to said heat pump for transmitting waste heat output from said engine to the low temperature side of said heat pump;
   (e) an unfired boiler operatively connected to said heat pump in a manner such that said boiler is in heat exchange relationship with the high temperature side of said heat pump; and
   (f) said means for transmitting waste heat output from said engine comprising means for placing the engine coolant in heat exchange relationship with the low temperature side of said heat pump and means for placing the engine exhaust in heat exchange relationship with said boiler and then in heat exchange relationship with the low temperature side of said heat pump.

* * * * *